UNITED STATES PATENT OFFICE.

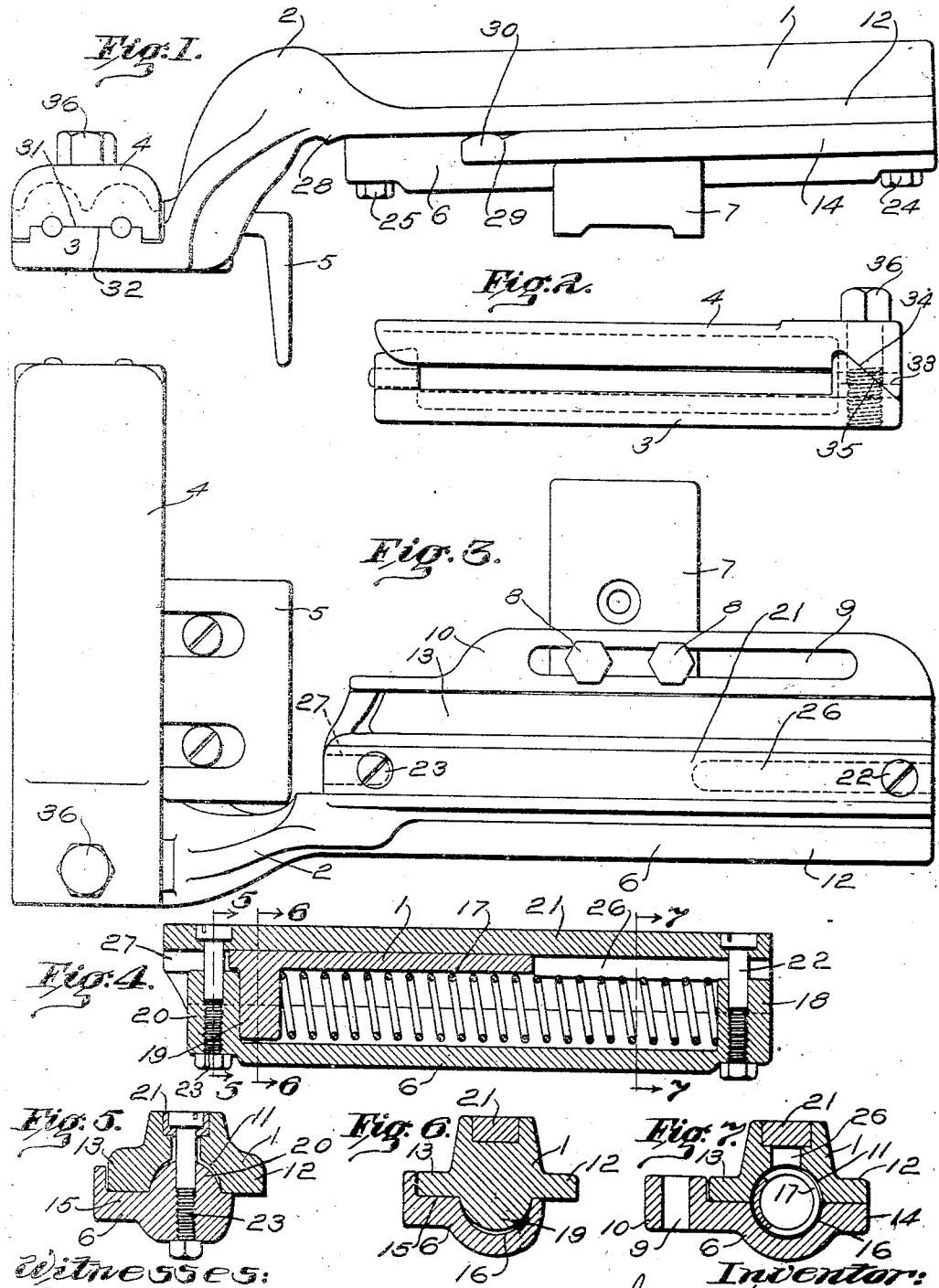

JONAS NORTHROP, OF HOPEDALE, MASSACHUSETTS, ASSIGNOR TO HOPEDALE MANUFACTURING COMPANY, OF HOPEDALE, MASSACHUSETTS, A CORPORATION OF MASSACHUSETTS.

LOOM-TEMPLE.

1,067,836.   Specification of Letters Patent.   Patented July 22, 1913.

Application filed September 19, 1912. Serial No. 721,160.

*To all whom it may concern:*

Be it known that I, JONAS NORTHROP, a citizen of the United States, residing at Hopedale, in the county of Worcester and State of Massachusetts, have invented certain new and useful Improvements in Loom-Temples; and I do hereby declare the following to be a full, clear, and exact description of the invention, such as will enable others skilled in the art to which it appertains to make and use the same.

The present invention relates to an improvement in loom-temples.

The object of the invention is to reorganize and improve the construction of loom-temples in order to secure greater durability of parts, particularly to stand the wear incident to the reciprocation of the temple rod, and in which the wear may be taken up by adjustment of the parts and then adequately secured in the readjusted position.

A further object of the invention is to produce an efficient and durable contrivance for holding the temple in inoperative position.

Other features of the invention will be pointed out in the specification.

To the above ends the present invention consists in the loom-temple hereinafter described and particularly defined in the claims.

In the accompanying drawings illustrating the preferred form of the invention, Figure 1 is a side elevation of the temple; Fig. 2 is a front elevation of the loom pod and cap; Fig. 3 is a plan of the temple; Fig. 4 is a longitudinal, vertical section of the temple rod and guide; and Figs. 5, 6 and 7 are cross-sections taken on the lines 5—5, 6—6 and 7—7 respectively of Fig. 4.

The temple rod 1 having a goose-neck 2 supports at its end the temple pod 3 covered with the temple cap 4. The temple heel 5 is secured to the temple pod in the usual manner by the screws shown in Fig. 3. The temple rod 1 is supported in a rod guide 6, in turn secured to the temple support 7 by means of bolts 8, the bolts passing through the slot 9 in the flange 10 of the rod guide 6.

Referring to Figs. 5, 6 and 7, wherein the temple rod 1 is shown in cross-section, it will be seen that it is substantially semi-cylindrical in form, being grooved longitudinally upon its lower side at 11; and provided with lateral bearings 12 and 13. These bearings 12 and 13 rest upon the bearings 14 and 15 of the rod guide 6 which is also of substantially semi-cylindrical form, being correspondingly and oppositely grooved at 16. These two grooves 11 and 16 together form a substantially cylindrical spring cavity for receiving the temple-rod spring 17, which is a helical compression spring having one end engaging the spring lug 18 formed on the end of the rod-guide 6, and its other end engaging the spring lug 19 projecting down from the under side of the temple rod into the spring cavity 16 of the rod guide. The spring 17 normally tends to press the temple-rod to the left, as viewed in Figs. 1, 3 and 4, thereby holding the temple in forward position. The temple-rod stop 20 limits the forward movement of the temple rod.
It is formed integral with the forward end of the rod guide 6. The spring lugs 18 and 19, together with the lateral bearings of the rod, form a part of the guiding devices for controlling the movements of the temple rod.
The bearings described form the principal bearings between the rod and rod guide. A further bearing is provided by grooving the upper side of the temple rod from end to end to receive a supplemental temple rod guide 21 which is secured to the rod guide proper 6 by means of the screw bolts 22 and 23 which pass through holes in the supplemental guide 21, and are screwed into the spring lug 18 and temple rod stop 20 respectively, and secured in adjusted position by means of lock nuts 24 and 25. The heads of the screw bolts 22 and 23 are received in recesses in the supplemental guide 21, and hold such guide in adjusted position in the groove in the top of the temple rod 1. As the bottom of the supplemental guide 21 wears into the groove in the top of the temple rod, and as the lateral bearings between the rod guide 6 and the rod 1 wear away, the screw bolts 22 and 23 will be screwed in to take up such wear, and to maintain the parts in proper bearing relation, and when so taken up they will be set in fixed position by the set nuts 24 and 25. The temple rod 1 is slotted at 26 and 27 to allow the reciprocation thereof without interference with the shanks of the screw bolts 22 and 23. It will be observed that the spring lugs 18 and 19, and the temple rod stop 20, are made somewhat shorter than the depth of the cavities which they enter, so that when the parts wear, adjustment may be had without being prevented by the bottoming of these lugs and stop in the cavities which receive them.

When it is desired to push the rod back in order to obtain access to the fell, as in picking out a broken weft, the operative will push the temple backward until the projection 28 on the under side of the temple rod springs into the recess 29 formed in the upper side of the rod guide 6. It is to be noted that when the rod is thus pushed back, the forward end of the temple rod is only supported from upward movement by the supplemental rod guide 21, and that such forward end of the temple rod slide will pass over the projection 30 by reason of the upward spring of the more or less flexible supplemental rod guide 21, as the pressure is exerted on this member at a distance from the screw bolt 22. The resilience of the supplemental rod guide 21 is sufficient to hold the projection 28 in the recess 29 against the pressure of the spring 17 until the operative knocks it loose or withdraws it forcibly therefrom.

The front elevation of the temple pod and cap, shown in Fig. 2, taken in connection with the end view shown in Fig. 1, show the construction of the cap and pod. The cap has a flat bearing surface 31 which rests upon the bearing surface 32 of the pod. This surface embraces the temple pins and supports them between the pod and cap. The contact surfaces 31 and 32 are indicated in Fig. 2 by the line 33. Inclined contact surfaces 34 and 35, both in the front and in the rear of the surfaces 31 and 32, serve to hold the cap and pod from any relative movement with relation to each other. The cap screw 36 secures the parts rigidly in correct relative position. The inclined contact surfaces 34 and 35 make coöperating projections and recesses on the pod and cap for maintaining the correct relative position required.

It will be observed that the temple rod is provided with laterally extended, wider, large bearings between it and the rod guide which supports the rod so that the wear will be slow, and the parts will long maintain their correct adjusted position. Also that when wear does occur, it can be expeditiously and efficiently taken up by tightening the screw bolts 22 and 23. No other operation is necessary to take up the wear. The locking of the temple in inoperative position by means of the coöperating projection 28 and recess 29 is efficiently secured by reason of the resilient pressure exerted by the supplemental rod guide upon the rod to hold its projection 2 in the recess.

The invention is not limited to the preferred form hereinbefore described, as it may be embodied in other forms within the scope of the following claims.

I claim:

1. A loom temple having, in combination, a temple rod carrying a temple roll and a rod guide adapted to be supported upon the frame of the loom, the rod being semi-cylindrically grooved upon its under side and the rod guide being similarly grooved upon its upper side, the two grooves being located opposite each other and together forming a spring cavity, a spring in said cavity taking at one end against a projection on the rod guide and at the other end against a projection on the rod, said rod and guide being provided with laterally extended bearings, and a supplemental rod guide secured to the rod guide proper for holding the rod on the rod guide, substantially as described.

2. A temple for looms having, in combination, a temple rod carrying a temple roll provided upon its under side with a semi-cylindrical longitudinal groove, and at its forward end with a spring lug, a rod guide adapted to be supported upon the frame of the loom having a semi-cylindrical longitudinal cavity in its upper side provided at its rear end with a spring lug and at its front end with a temple rod stop, a spring, located in the cylindrical cavity formed by the cavities in the two members, abutting at one end against the spring lug on the rod guide and at the other end against the spring lug on the rod, holding the latter against the rod stop, and means for holding the rod in position on the rod guide, substantially as described.

3. A loom temple having, in combination, a temple rod carrying a temple roll and a rod guide adapted to be supported upon the frame of the loom, the rod and guide having a spring cavity formed by grooves in the adjacent sides of each, a spring in said cavity engaging the rod guide at one end and the rod at the other, bearings on the rod and rod guide for supporting the former on the latter, and a supplemental rod guide secured to the rod guide proper and arranged to bear upon the upper side of the rod, substantially as described.

4. A loom temple having, in combination, a temple rod carrying a temple roll, a rod guide adapted to be supported upon the frame of the loom, a supplemental rod guide secured at its ends to the ends of the rod guide proper bearing upon the top of the rod for holding it in bearing relation with the rod guide, said rod and rod guide having a coöperating recess and projection so located as to engage each other when the temple is pushed back to inoperative position and at a distance from the means for attaching the supplemental rod guide to the rod guide proper, substantially as described.

5. A temple for looms having, in combination, a temple rod carrying a temple roll, a rod guide adapted to be supported upon the frame of the loom, said rod and guide having a coöperating projection and recess adapted to coöperate when the temple is pushed backward to inoperative position to hold the temple in such position, such projection and recess being located the one above the other so that the disengagement of the rod from the guide is secured by means of the vertical movement of the rod, substantially as described.

6. A temple for looms having, in combination, a semi-cylindrical, laterally flanged temple rod for carrying the temple roll, and a semi-cylindrical, laterally flanged rod guide adapted to be secured to the frame of the loom, and means for holding the rod on the rod guide, substantially as described.

7. A temple for looms having, in combination, a semi-cylindrical temple rod and a semi-cylindrical rod guide and a supplemental guide for holding the rod against the rod guide proper, substantially as described.

8. A temple for looms having, in combination, a semi-cylindrical temple rod, a semi-cylindrical rod guide, and means for securing the rod to the guide, substantially as described.

9. A temple for looms having, in combination, a temple rod carrying a temple roll and having a slot in its upper guide, a temple rod guide, said rod and guide having long lateral bearing surfaces, and a supplemental rod guide located in said slot and adjustably secured to the rod guide, substantially as described.

10. A temple for looms having, in combination, a temple rod carrying a temple roll and having long lateral bearings, a rod guide adapted to be supported upon the frame of the loom, having long lateral bearings adapted to engage the lateral bearing portions of the temple rod, said temple rod being provided on its upper side with a longitudinal slot, a supplemental rod guide located in the slot, and means for adjustably securing the supplemental guide in the slot, having provision for holding it from movement away from the rod guide, substantially as described.

11. A temple for looms having, in combination, a temple rod carrying a temple roll and a rod guide adapted to be supported upon the frame of the loom, said rod and guide having the one a projection and the other a recess, and resilient means for holding the projection in the recess for locking the temple in inoperative position having provision by virtue of which, upon the application of a pull on the rod it will be released, substantially as described.

JONAS NORTHROP.

Witnesses:
HORACE VAN EVEREN,
GEORGE E. STEBBINS.

---

It is hereby certified that in Letters Patent No. 1,067,836, granted July 22, 1913, upon the application of Jonas Northrop, of Hopedale, Massachusetts, for an improvement in "Loom-Temples," errors appear in the printed specification requiring correction as follows: Page 2, line 49, for the word "wider" read *wide;* page 3, line 34, for the word "guide" read *side;* and that the said Letters Patent should be read with these corrections therein that the same may conform to the record of the case in the Patent Office.

Signed and sealed this 2nd day of September, A. D., 1913.

[SEAL.]

THOMAS EWING,
*Commissioner of Patents.*

It is hereby certified that in Letters Patent No. 1,067,836, granted July 22, 1913, upon the application of Jonas Northrop, of Hopedale, Massachusetts, for an improvement in "Loom-Temples," errors appear in the printed specification requiring correction as follows: Page 2, line 49, for the word "wider" read *wide;* page 3, line 34, for the word "guide" read *side;* and that the said Letters Patent should be read with these corrections therein that the same may conform to the record of the case in the Patent Office.

Signed and sealed this 2nd day of September, A. D., 1913.

[SEAL.]

THOMAS EWING,
*Commissioner of Patents.*